(12) United States Patent
Beck et al.

(10) Patent No.: US 7,706,576 B1
(45) Date of Patent: Apr. 27, 2010

(54) DYNAMIC VIDEO EQUALIZATION OF IMAGES USING FACE-TRACKING

(75) Inventors: Alexander John Gray Beck, French's Forest (AU); Jonathan R. Yee-Hang Choy, Wahroonga (AU); Alexander Martin Scholte, Phegans Bay (AU); David Preshan Thambiratnam, Ashfield (AU)

(73) Assignee: Avaya Inc., Basking Ridge, NJ (US)

( * ) Notice: Subject to any disclaimer, the term of this patent is extended or adjusted under 35 U.S.C. 154(b) by 1153 days.

(21) Appl. No.: 11/025,493

(22) Filed: Dec. 28, 2004

(51) Int. Cl.
*G06K 9/00* (2006.01)
*G06K 9/34* (2006.01)
*G06K 9/46* (2006.01)
*G06K 9/40* (2006.01)
*H04N 7/14* (2006.01)
*H04N 7/12* (2006.01)
*H04N 11/02* (2006.01)
*H04N 11/04* (2006.01)

(52) U.S. Cl. .................. 382/118; 382/164; 382/173; 382/203; 382/243; 382/274; 348/14.01; 348/14.12; 375/240.08

(58) Field of Classification Search ........... 382/118, 382/164, 173, 203, 209, 243, 274; 348/14.01, 348/14.12; 375/240.08
See application file for complete search history.

(56) References Cited

U.S. PATENT DOCUMENTS

| | | | |
|---|---|---|---|
| 4,791,660 A | 12/1988 | Oye et al. | |
| 5,164,992 A | 11/1992 | Turk et al. | |
| 5,206,903 A | 4/1993 | Kohler et al. | |
| 5,280,561 A | 1/1994 | Satoh et al. | |
| 5,349,379 A | 9/1994 | Eichenlaub | |
| 5,359,362 A | 10/1994 | Lewis et al. | |
| 5,430,473 A | 7/1995 | Beecher, II et al. | |
| 5,506,872 A | 4/1996 | Mohler | |
| 5,619,254 A | 4/1997 | McNelley | |
| 5,675,376 A | 10/1997 | Andersson et al. | |
| 5,731,805 A | 3/1998 | Tognazzini et al. | |

(Continued)

FOREIGN PATENT DOCUMENTS

EP 0 118 182 9/1985

(Continued)

OTHER PUBLICATIONS

Bailenson et al.; "Transformed Facial Similarity as a Political Cue: A Preliminary Investigation"; In Press, Political Psychology; Department of Communication, Stanford University; 22 pages; undated.

(Continued)

*Primary Examiner*—Bhavesh M Mehta
*Assistant Examiner*—Michael A Newman
(74) *Attorney, Agent, or Firm*—Sheridan Ross P.C.

(57) ABSTRACT

The present invention provides for the dynamic video equalization of images. Face tracking is used to identify a portion of an image corresponding to a human face. Those areas of the image identified as corresponding to a human face are optimized as compared to other areas of the image. Optimization is performed by allocating a greater number of image parameters to the area of the image corresponding to a human face than are allocated to other areas of the image. Accordingly, the portion of an image containing the human face is of higher quality as compared to other portions of the image.

21 Claims, 4 Drawing Sheets

U.S. PATENT DOCUMENTS

| | | | |
|---|---|---|---|
| 5,828,747 | A | 10/1998 | Fisher et al. |
| 5,839,000 | A | 11/1998 | Davis, Jr. et al. |
| RE36,041 | E | 1/1999 | Turk et al. |
| 5,905,525 | A | 5/1999 | Ishibashi et al. |
| 5,905,793 | A | 5/1999 | Flockhart et al. |
| 5,982,873 | A | 11/1999 | Flockhart et al. |
| 5,986,703 | A | 11/1999 | O'Mahony |
| 6,046,767 | A | 4/2000 | Smith |
| 6,163,607 | A | 12/2000 | Bogart et al. |
| 6,173,053 | B1 | 1/2001 | Bogart et al. |
| 6,192,122 | B1 | 2/2001 | Flockhart et al. |
| 6,343,141 | B1* | 1/2002 | Okada et al. ............. 382/118 |
| 6,463,220 | B1 | 10/2002 | Dance et al. |
| 6,483,531 | B1 | 11/2002 | Ryu |
| 6,496,217 | B1* | 12/2002 | Piotrowski ............. 348/14.12 |
| 6,498,684 | B1 | 12/2002 | Gladnick et al. |
| 6,507,356 | B1 | 1/2003 | Jackel et al. |
| 6,556,196 | B1 | 4/2003 | Blanz et al. |
| 6,593,955 | B1* | 7/2003 | Falcon ............. 348/14.01 |
| 6,597,736 | B1* | 7/2003 | Fadel ............. 375/240.01 |
| 6,603,491 | B2 | 8/2003 | Lemelson et al. |
| 6,680,745 | B2 | 1/2004 | Center, Jr. et al. |
| 6,744,927 | B1* | 6/2004 | Kato ............. 382/239 |
| 6,753,900 | B2 | 6/2004 | Runcie et al. |
| 6,801,642 | B2* | 10/2004 | Gorday et al. ............. 382/118 |
| 6,812,956 | B2 | 11/2004 | Ferren et al. |
| 6,864,912 | B1 | 3/2005 | Mahaffey et al. |
| 6,878,924 | B2 | 4/2005 | Baron |
| 7,023,464 | B1 | 4/2006 | Harada et al. |
| 7,091,928 | B2 | 8/2006 | Rajasingham |
| 7,262,788 | B2 | 8/2007 | Ono et al. |
| 7,269,292 | B2* | 9/2007 | Steinberg ............. 382/243 |
| 2002/0061131 | A1 | 5/2002 | Sawhney et al. |
| 2002/0113862 | A1 | 8/2002 | Center, Jr. et al. |
| 2004/0012613 | A1 | 1/2004 | Rast |
| 2004/0210844 | A1 | 10/2004 | Pettinati et al. |
| 2005/0185045 | A1* | 8/2005 | Kamariotis ............. 348/14.12 |
| 2005/0210105 | A1 | 9/2005 | Hirata et al. |
| 2005/0248651 | A1 | 11/2005 | Hirata et al. |

FOREIGN PATENT DOCUMENTS

| | | |
|---|---|---|
| FR | 2529352 | 12/1983 |
| JP | 401221086 A | 9/1989 |
| JP | 404344788 A | 12/1992 |
| JP | 05219269 | 8/1993 |
| WO | WO 99/57900 | 11/1999 |
| WO | WO 02/085018 | 10/2002 |

OTHER PUBLICATIONS

"FRANN: Face Recognition Using Artificial Neural Network" html version of the file http://www.ece.stevens-tech.edu/ds/archie/03F-04S/deliverables/grp19/Fall_Proposal.pdf; date submitted Oct. 14, 2003; 43 pages.

Cula et al., "Recognition Methods for 3D Textured Surfaces", Proceedings of SPIE conference of Human Vision and Electronic Imaging VI, San Jose, Jan. 2001.

TheFreeDictionary.com website entitled, "Neural Network," Farlex Inc. (2004), available at http://encyclopedia.thefreedictionary.com/neural%20network, 6 pages.

TheFreeDictionary.com website entitled, "Feedforward," Farlex Inc. (2004), available at http://encyclopedia.thefreedictionary.com/feedforward, 3 pages.

TheFreeDictionary.com website entitled, "Sigmoid function," Farlex Inc. (2004), available at http://encyclopedia.thefreedictionary.com/sigmoid%function, 2 pages.

TheFreeDictionary.com website entitled, "Genetic algorithm," Farlex Inc. (2004), available at http://encyclopedia.thefreedictionary.com/genetic%20algorithm, 6 pages.

TheFreeDictionary.com website entitled, "Neuroevolution," Farlex Inc. (2004), available at http://encyclopedia.thefreedictionary.com/Neuroevolution, 2 pages.

TheFreeDictionary.com website entitled, "Pattern recognition," Farlex Inc. (2004), available at http://encyclopedia.thefreedictionary.com/Pattern%20recognition, 3 pages.

Facial Recognition Overview, Imagis Technologies Inc. (2004), available at http://www.imagistechnologies.com/Products/FaceRecognition/, 1 page.

Data Sheet entitled, "Motion Image Separation Technology," NetWatch® Mist® (undated), 2 pages.

Machine Vision Technology, Neven Vision (2003-2004), available at http://www.nevenvision.com/technology, 10 pages.

Partek website entitled, "Turning Data into Discovery," (2004), available at http://www.partek.com/, 1 page.

Soongsathitanon et al., "A New Orthogonal Logarithmic Search Algorithm for Fixed Block-Based Motion Estimation for Video Coding," date unknown.

Software and Hardware for Data Analysis Pattern Recognition and Image Processing, The Pattern Recognition Files, maintained by Ela Pekalska (Jan. 24, 2004), available at http://www.ph.tn/tudelft.nl/PRInfo/software.html, 5 pages.

Atienza et al.; "A Practical Zoom Camera Calibration Technique: An Application on Active Vision for Human-Robot Interaction"; Research School of Information Sciences and Engineering, The Australian National University, Canberra ACT 0200 Australia; (2001); 6 pages.

"Eyegaze Analysis System"; LC Technologies, Inc.; http://www.eyegaze.com/2Products/Development/Developmentmain.htm; 2003; 9 pages.

"Gaze Point Detection"; http://wwwsyseng.rsise.anu.edu.au/rsl/hrintact/gazepoint.html; Oct. 24, 1997; 2 pages.

Kawato et al.; "Detection and Tracking of Eyes for Gaze-camera Control"; ATR Media Information Science Laboratories; (2002); 6 pages.

Kim et al.; "Intelligent Process Control Via Gaze Detection Technology"; Aug. 3, 1999; 1 page.

Kurniawan et al.; "Design and User Evaluation of a Joystick-operated Full-screen Magnifier"; Conference on Human Factors in Computing Systems, Proceedings of the Conference on Human Factors in Computing Systems; 2003, 4 pages.

Magee et al.; "EyeKeys: A Real-Time Vision Interface Based on Gaze Detection from a Low-grade Video Camera"; IEEE; 2004; 8 pages.

Perez et al.; "A Precise Eye-Gaze Detection and Tracking System"; Departamento de Artiquitectura y Tecnologia de Sistemas Informáticos (Department of Architecture and Technology of Systems Information)(DATSI); Feb. 2003, 4 pages.

"Quick Glance 1"; Eye Tech Digital Systems; http:www.eyetechds.com/qglance1.htm; (date unknown); 2 pages.

"Blind Source Separation of recorded speech and music signals", available at http://www.cnl.salk.edu/~tewon/Blind/blind_audio.html, printed Dec. 29, 2004.

"Nokia 6100 Cellular Phones", available at http://www.mediaplace.nl/nokia-6100-cellular-pho..., website updated Dec. 9, 2004, pp. 1-4.

"Student Voicemail Information", University of Saint Francis, available at http://www.sf.edu/computing/voicemail.shtml, website updated Feb. 10, 2005, pp. 1-3.

Kawato et al., Image and Vision Computing, "Detection and Tracking of Eyes for Gaze-camera Control," 22(12):1031-1038, Mar. 2004.

LMS, Blind Source Separation, 4 pages at http://www.Int.de/LMS/research/projects/BSS/index.php?lang=eng, printed Dec. 29, 2004.

Rickard, "Blind Source Separation", available at http://eleceng.ucd.ie/~srickard/bss.html, last modified Jul. 2, 2004, pp. 1-3.

TheFreeDictionary.com website entitled, "Image analysis," Farlex Inc., printed Jul. 7, 2008, available at http://encyclopedia.thefreedictionary.com/image%20analysis, pp. 1-3.

Background of the Invention for the above-captioned application (previously provided).

U.S. Appl. No. 10/459,182, Chan et al.

U.S. Appl. No. 10/941,199, Beck.

U.S. Appl. No. 10/949,781, Lang et al.

Cisco Systems, Inc., "Cisco VT Advantage Video Telephony Solution," (1992-2004), pp. 1-6.

CDM Optics, "Image Gallery," (2001).

Digibird.com, "Essential Optics for Digiscoping," (2002), available at http://www.digibird.com/primerdir/primer0.htm, 4 pages.

Fintzel et al., "Real Time 3D Navigation in a Static Virtualzied Scene from a Limited Set of 2D Data," IEEE Int'l Conf. on Multimedia & Expo 2000, New York, Electronic Proceedings, 11 pages.

The Imaging Source website, "Introduction to Optics and Lenses," (2003), available at http://www.theimagingsource.com/prod/opt/opticsintro_2.htm, 10 pages.

Mark et al., "Post-Rendering 3D Warping", In Proceedings of 1997 Symposium on Interactive 3D Graphics, Providence, RI, Apr. 27-30, 1997, pp. 7-16.

Marpe et al., "Video Compression Using Context-Based Adaptive Arithmetic Coding," Proc. IEEE International Conference on Image Processing (ICIP'01), vol. III, pp. 558-561, Oct. 2001.

Nikon MicroscopyU: Interactive Java Tutorials website, "Digital Camera Resolution Requirements for Optical Microscopy," (2000-2004), available at http://www.microscopyu.com/tutorials/java/digitalimaging/pixelcalculator, 4 pages.

"Nordic Guide to Video Telephony and Video Relay Service," The Nordic Forum for Telecommunication and Disability 2002, NFTH Mar. 2002, pp. 1-14.

Oshima, Shigeru, "Acquisition: Fundamental Optics of Television Camera Lenses," shortened version of the Fundamental Optics section in *Canon Guidebook of Television System Optics* (2$^{nd}$ Ed. ), (Jan. 2000), 13 pages.

Soongsathitanon, Somphob, et al., University of Newcastle upon Tyne, "A New Orthogonal Logarithmic Search Algorithm for Fixed Block-Based Motion Estimation for Video Coding," date unknown, 4 pages.

Techno World, "Multimedia Cameras for Visual Society: Ultraminiature Multimedia Camera Systems," (undated), 6 pages.

Wolberg, George, "Digital Image Warping," IEEE Computer Society Press Monograph (Mar. 4, 2002), available at http://www-cs.ccny.cuny.edu/~wolberg/diw.html, 7 pages.

Brandstein, Michael, "Real-Time Face Tracking Using Audio and Image Data," Harvard Intelligent Multi-Media Environment Laboratory (HIMMEL) (undated), pp. 1-22.

Eisert, Peter, "Immersive 3-D Video Conferencing: Challenges, Concepts, and Implementations," Proc. SPIE Visual Communications and Image Processing (VCIP), Lagano, Switzerland (Jul. 2003), 11 pages.

Imagis Technologies Inc. News Release, "Imagis Technologies Releases Major Upgrade to Face Recognition Software," (Sep. 2002).

Entropy Software Laboratory, "Image Recognition" (undated), available at http://www.entropysoftwarelab.com/technology/imageRecognition.html, 3 pages.

Sanyo Electric Co., Ltd., "Character and Image Recognition Technology," Technology R&D Headquarters (2003), available at http://www.sanyo.co.jp/R_and_D/english/theme/c-2.html, 2 pages.

Toshiba Corporation Press Release, "Toshiba Announces World's First Image Recognition LSI for Intelligent Vehicle System," (Feb. 6, 2001), available at http://www.toshiba.co.jp/about/press/2001_02/pr0602.htm, 3 pages.

Jun, Song F. et al., *Optical Feature Recognition*, (Mar. 6, 1995), 1 page.

Peter Kauff Projects, "BS-Immersive Media & 3D Video Group," (Ed. Christoph Fehn, Nov. 12, 2002), 6 pages.

* cited by examiner

DYNAMIC VIDEO EQUALIZATION OF IMAGES USING FACE-TRACKING

FIELD OF THE INVENTION

The invention relates to an image acquisition system and in particular to an image acquisition system in which a selected area of an image is optimized.

BACKGROUND OF THE INVENTION

The use of video conferencing or telephony, which allows remote parties to both see and hear one another, is becoming increasingly popular. As used herein, "video telephony" refers to communications using both video and audio transmitted over a communications network. Such applications facilitate remote communications by providing a visual image of each conference participant. Accordingly, video conferencing allows parties to communicate audibly and visibly, without requiring lengthy and expensive travel.

In a typical video telephony application, a camera is positioned to obtain an image of each of the participants at each endpoint of the communication. The image of a participant at one endpoint is then provided to a participant at another endpoint, so that each participant is viewing the other during the communication session. The video telecommunications interaction can include two or more endpoints, and each endpoint can include more than one participant.

The image that is transmitted during a video conference is often of inferior quality. A number of factors can contribute to the inferior quality of transmitted images. For example, contrast and color saturation levels may be incorrectly set at the transmitting end. In addition, the amount of data that is used to describe an image is often limited, for example due to transmission bandwidth constraints. Furthermore, these limitations on image quality are often exacerbated by poor lighting conditions.

Video cameras that are capable of supporting backlight compensation are capable of removing peaks in image intensity. Such backlight compensation may operate by equalizing the overall image histogram to remove the peaks in image intensity. Although such techniques can be effective at providing an image having improved quality overall, they do not specifically act to improve the quality of those portions of the image that correspond to the face of an imaged participant. Accordingly, the area of the image corresponding to the face of a participant in a video conference may continue to be of relatively low quality.

In order to allow a camera to provide an image that is centered on the face of a participant, face tracking capabilities are available. In a system that provides automatic face tracking, the camera will be zoomed into a detected face and will attempt to make the face dominate the image, thus reducing the effect of the surrounding environment. Although such systems can be effective at following a participant moving around a scene, image information related to background objects is described using the same image parameters available for those portions of the image comprising the face being tracked. As a result, the portion of the image corresponding to the tracked face can be of lower quality than is desired. In particular, because there is a fixed amount of image detail that can be encoded, and because an equal range of available image parameters is devoted to background information as is devoted to the face of the participant, a portion of the finite image information is consumed describing the relatively unimportant background portions of the image.

SUMMARY OF THE INVENTION

The present invention is directed to solving these and other problems and disadvantages of the prior art. In accordance with embodiments of the present invention, the portion of an image corresponding to the face of a person is optimized. Such optimization is done with the recognition that background information, for instance, any portion of the image that does not comprise the face of a participant, will have poorer image quality as a result. In this way, the limited information available for describing an image is unevenly allocated between portions of the image corresponding to a participant's face and other areas of the image, to improve the quality of the image in the significant areas.

In accordance with embodiments of the present invention, an image of a scene is obtained. Face tracking technology is then used to identify the portion or portions of the image that contain the face of a person. The area corresponding to those portions of the image that contain the face of a person are then optimized. Such optimization may include allocating a greater number or range of available parameter values to the image information included in the area corresponding to the participant's face than are allocated to other areas of the image. Examples of such parameters include an available range of colors, an available range of brightness levels, an available amount of resolution and an available range of contrast.

In accordance with further embodiments of the present invention, a system providing for dynamic video equalization of images using face tracking is provided. The system may include an imaging camera for obtaining an image of a scene. The system may further include a processor capable of implementing a face tracking application. Furthermore, the processor is generally capable of selectively optimizing an image based on output from the face tracking application. More particularly, a greater number or range of available image parameters can be dedicated to describing portions or areas of the image that correspond to the face of a person than to background areas. In accordance with still other embodiments of the present invention, a video output device or display may be provided for reproducing dynamically equalized images.

Additional features and advantages of the present invention will become more readily apparent from the following discussion, particularly when taken together with accompanying drawings.

DETAILED DESCRIPTION

Figure 1:
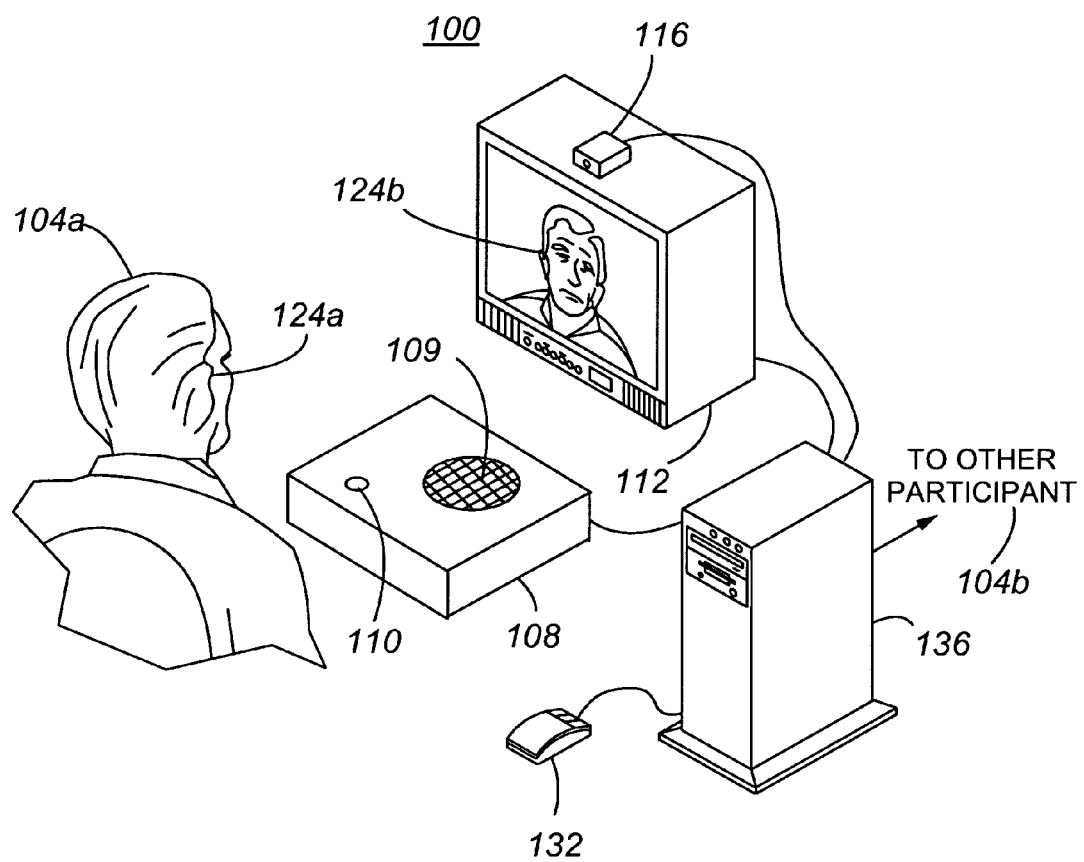
FIG. 1 depicts a video conferencing image acquisition and processing system in an example video conferencing environment in accordance with embodiments of the present invention.

With reference now to FIG. 1, a video conferencing image acquisition and processing system 100 (also referred to herein as video conferencing system 100) in accordance with embodiments of the present invention is illustrated in an exemplary video conferencing environment. In general, a first participant or person 104a interacts with the video conferencing system 100 to allow the first participant 104a to communicate both audibly and visibly with another (e.g., a second) participant 104b at a remote location. Accordingly, the video conferencing system 100 generally includes an audio transceiver 108, which includes a speaker 109 and microphone 110; a video display 112; and a camera 116. In operation, the camera 116 obtains an image that normally includes the face 124a of the first video conference participant 104a, while the display 112 outputs an image 120 that includes the face 124b of the other video conference participant.

The video conferencing system 100 may additionally provide a user selection input device 132 associated with a processor 136, in order to control aspects of the operation of the video conferencing system 100. Furthermore, the processor 136 can operate to process image information obtained by the camera 116 to enhance those portions of the image that include or comprise the face 124 of the first participant 104, as described in greater detail elsewhere herein.

Figure 2:
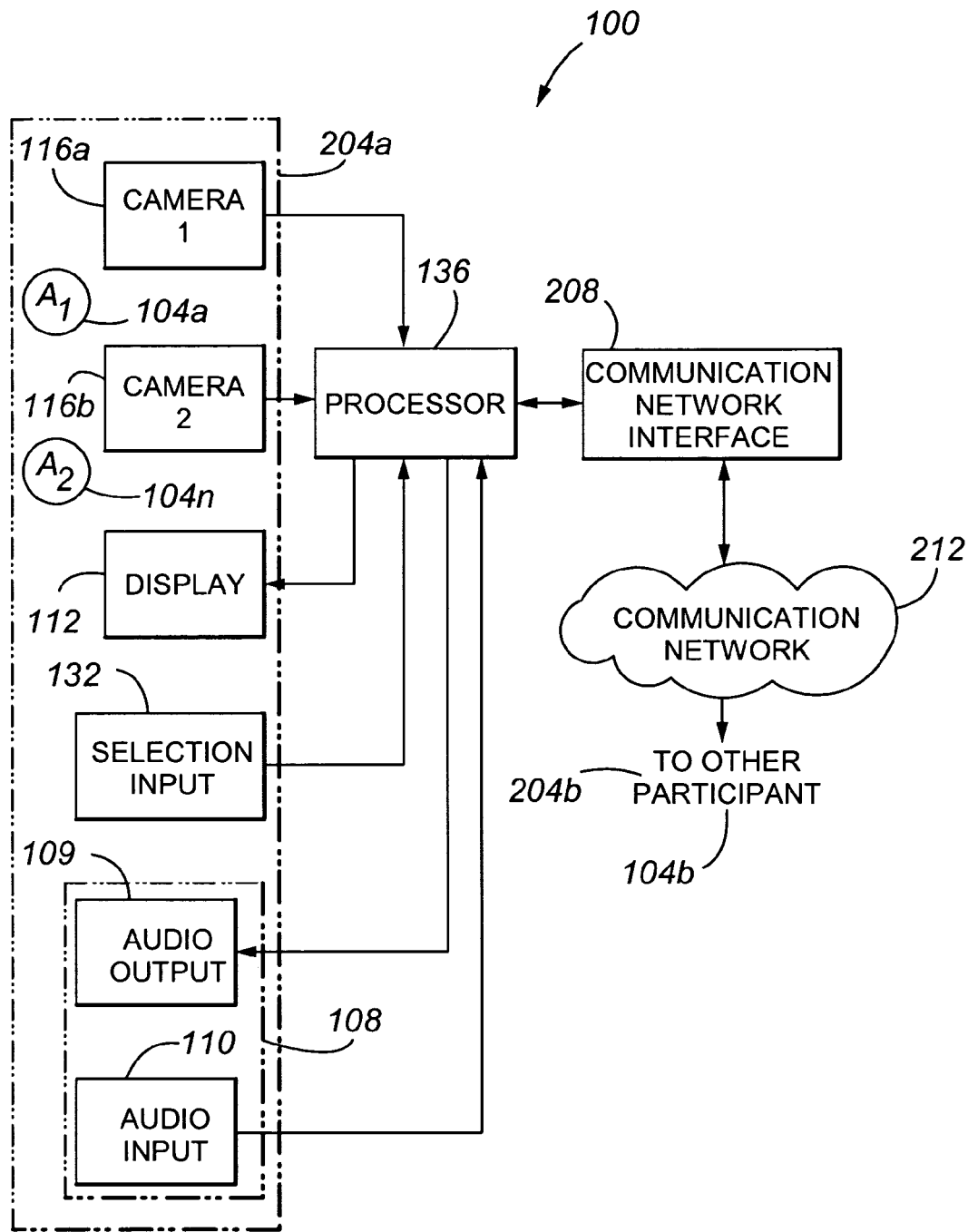
FIG. 2 is a block diagram depicting components of a video conferencing image acquisition and processing system in accordance with embodiments of the present invention.

With reference now to FIG. 2, components that may be included as part of a video conferencing system 100 in accordance with embodiments of the present invention are depicted in block diagram form. As noted above, the video conferencing system 100 generally functions in connection with at least first and second video conference participants at first 204a and second 204b video conference locations respectively. Furthermore, as depicted in FIG. 2, a number of participants 104a-n may be associated with each video conference location 204 that is party to a communication session.

Each video conference location 204 in accordance with embodiments of the present invention may include an audio transceiver 108 comprising a speaker 109 and microphone 110. In addition, each video conference location 204 may include a display 112, camera 116 and a selection input device 132. In addition, the devices or components associated with a video conference location 204 may be interconnected to a processor or controller 136. The processor 136 may be sited at the first video conference location 204. Alternatively, the processor 136 may be sited at a different location. Furthermore, functions of the processor or controller 136 may be distributed among various locations 204 or nodes associated with the video conferencing system 100. The processor or controller 136 may be interconnected to or associated with a communication network interface 208 that interconnects the processor or controller 136 and the associated components to a communication network 212, and in turn to a participant or participants at a second video conferencing location 204b.

As also depicted in FIG. 2, multiple instances of various devices or components may be provided. For example, a number of cameras 116 may be associated with a single video conference location 204. Although first 116a and second 116b cameras are shown, it should be appreciated that embodiments of the present invention are not limited to any particular number of cameras 116. Furthermore, a number of participants 104 may be associated with a video conference location 204. Although first 104a and second 104n video conference participants are illustrated in connection with the first video conference location 204a, it can be appreciated that the number of participants 104 associated with any given video conference location 204 is not limited to any particular number.

The audio transceiver 108 provides audio output through a speaker 109 and audio input through a microphone 110. In accordance with embodiments of the present invention, the audio transceiver 108 comprises a speaker phone having common telephony functionality. According to further embodiments of the present invention, the audio transceiver 108 comprises a speaker 109 and a microphone 110 that functions as part of a soft phone or video phone running on a processor 136 comprising a general purpose or personal computer. According to other embodiments, the audio transceiver 108 may be provided as part of a video telephone. In general, the audio transceiver 108 may be any device capable of translating acoustical signals into electrical signals and vice versa.

The display 112 may comprise any device capable of receiving a video signal and displaying a corresponding image. Accordingly, the display 112 may comprise a cathode ray tube or a liquid crystal display. The display 112 may be provided, for example, as part of general purpose computer, as part of a video telephone, or as a monitor.

The camera 116 may be any device capable of translating images of a scene into electronic signals. For example, a camera 116 may comprise an optical lens system in combination with an image sensor, such as a charge coupled device (CCD). The camera 116 may be provided, for example, as part of a video telephone or as a computer peripheral.

The user selection input device 132 may comprise various devices for receiving input from a user, such as a video conferencing participant 104. For example, the user selection input device 132 may comprise a keyboard; a pointing device, such as a mouse or track ball; a numeric keypad; a touch sensitive display screen integrated with the display 112; and/or a voice recognition system operating in connection with the audio transceiver 108. Signals from the user selection input device 132 are provided to the processor 136.

The processor 136 may, as mentioned above, comprise a general purpose or personal computer. In addition, the processor 136 may comprise a specially adapted video conferencing processor unit, for example utilizing a specialized controller or a general purpose processor running code specifically adapted for performing video conferencing functions. For example, the processor 136 may comprise a personal computer running a video conferencing software application in connection with a standard operating system, such as the Windows® operating system. As a further example, the processor 136 may comprise a video telephone incorporating a suitably programmed controller running firmware for implementing functions described herein.

In particular, in connection with embodiments of the present invention, the processor 136 runs a video conferencing image acquisition and processing application that incorporates the ability to enhance portions of an image obtained by a camera 116 at the expense of other portions of that image. More particularly, embodiments of the present invention combine face tracking functions with image enhancement functions that provide for an improved or optimized image in those areas of the overall image that correspond to the face 124 of a video conference participant 104. More particularly, the image taken by a camera 116 is processed by the processor 136 to determine the portion or portions of that image that correspond to the face of a video conference participant 104. As can be appreciated by one of skill in the art, such face tracking functions may apply spatial segmentation algorithms or techniques. Once the area or areas corresponding to the face of a video conference participant 104 has been determined, those portions of the image are enhanced relative to other portions of the image. For example, as will be described in greater detail elsewhere herein, image data parameters, such as contrast, brightness, color depth and resolution are optimized for the areas of the image corresponding to the face 124 of a participant 104. Such optimization may comprise devoting a greater portion of an available range of parameter values to those portions of the image corresponding to a participant's face 124 as compared to other portions of the image. Furthermore, such functions may be considered dynamic, since the image pixels comprising a face 124 will typically change from frame to frame of video.

Figure 3A:
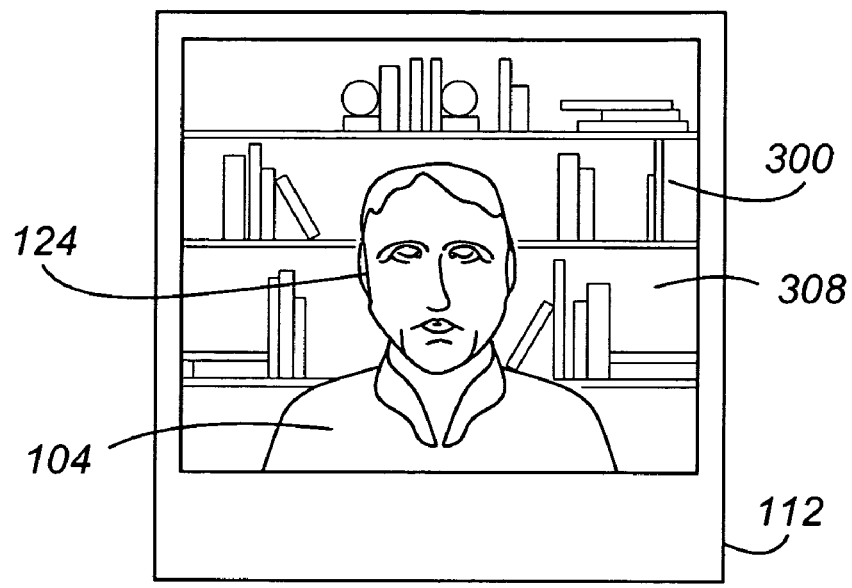
FIG. 3A depicts image information without alteration by a system in accordance with embodiments of the present invention.
Figure 3B:
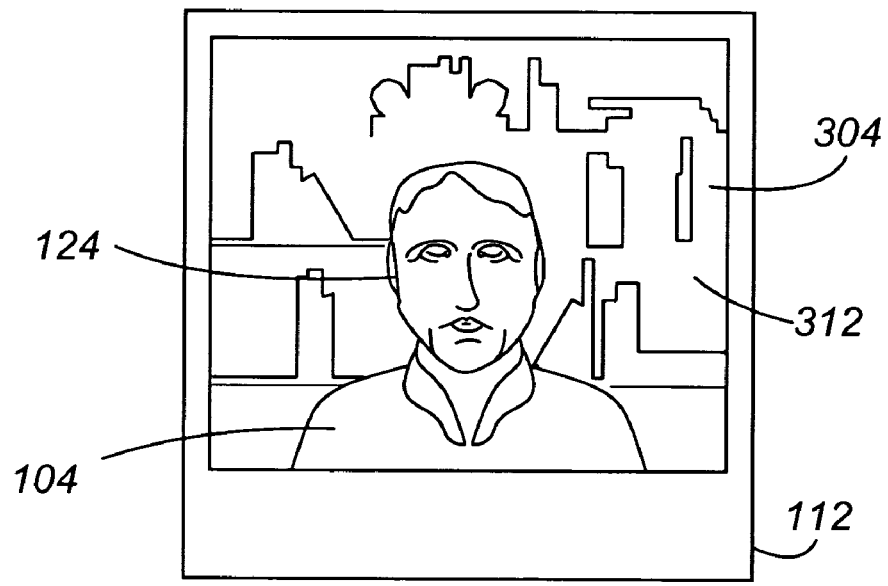
FIG. 3B depicts image information after alteration by a system in accordance with embodiments of the present invention.

With reference now to FIG. 3A, an example of an image 300 obtained by a camera 116 and output at a display 112 without optimization of areas incorporating a face 124 of an imaged person 104 is depicted. More particularly, the image 300 is representative of an image that was obtained by a camera 116 at a first video conference location 204*a* and displayed by a display 112 at a second video conference location 204*b*. In FIG. 3B, image data including the face 124 of an imaged video conference participant 104 that has been processed in accordance with embodiments of the present invention is depicted. More particularly, FIG. 3B represents an image 304 that was obtained by a camera 116 at a first video conference location 204*a*, processed by a processor 136 to optimize the face 124 of the imaged user, and displayed by a display 112 associated with a second video conference location 204*b*. The image 300 of FIG. 3A depicts the same scene as in the image 304 depicted in FIG. 3B. However, it is apparent that the face 124 of the video conference participant 104 in FIG. 3A lacks detail as compared to the face 124 in FIG. 3B. Furthermore, the background 308 shown in FIG. 3A includes detail that is missing from the background 312 of the image 304 in FIG. 3B. Accordingly, it can be appreciated that FIGS. 3A and 3B illustrate that an image 300 that might be displayed in connection with a conventional video conference system generally depicts the face 124 of a video conference participant 104 with lower quality than does a video conferencing system 100 that applies image processing in accordance with embodiments of the present invention, as depicted in FIG. 3B. Furthermore, it can be appreciated that the background 308 in a conventional video conference system generally is of higher quality than is the background 312 of an image 304 that has been processed in accordance with embodiments of the present invention. As can be appreciated by one of skill in the art, the differences between images 300 and 304 shown in FIGS. 3A and 3B are provided as an exemplary depiction or suggestion of differences between conventional images and images processed in accordance with the disclosure provided herein.

The differences between the image 300 of FIG. 3A and the image 304 of FIG. 3B are generally the result of different allocations of available image information. As can be appreciated by one of skill in the art, image information output by or available from a camera 116 at a first video conference location 204*a* is typically compressed or simplified locally before it is transmitted to a receiving or second video conference location 204*b* to be output by a display 112. In particular, the image 300 produced using a conventional video conferencing system allocates the limited amount of information available to encode an image equally across the entire image 300. In contrast, the video conferencing system 100 in accordance with embodiments of the present invention produces an image 304 in which more of the available image information is allocated to areas of the image corresponding to the face 124 of a participant 104 than to the background 312. This differential allocation has the effect of optimizing or equalizing the image 304 to display the face 124 included in the image 304 in higher fidelity than other portions of the image 304, such as the background 312.

Examples of the image information that may be allocated differentially between different portions of an image 304 include contrast, brightness, color depth, and resolution. Therefore, a specific example of allocating greater image information to a specific portion of an image may be given in terms of color depth. In this example, a system or video conferencing protocol limited to transmitting and displaying no more than 256 colors is assumed. In representing the area corresponding to the face 124 of the video conference participant 104, a greater number of colors may be made available by embodiments of the present invention to represent the face 124 of the participant 104 than to the background 312. For instance 254 colors could be available for representing the portion of the image 304 corresponding to the face 124, while the remaining two colors could be allocated to representing the background 312. Of course, other allocations of available image parameters can be made. For example, 200 colors can be used to represent the face 124 while the remaining 56 colors could be used to represent the background 312. Furthermore, a particular video conferencing system 100 may make other differential allocations of image parameters that favor detailed representation of the face 124 of a participant 104 over or at the expense of the background 304 of an image. Because of such differential allocation, it can be appreciated that the face 124 may be represented in greater detail, while distortions may occur with respect to the background 312, as compared to a conventional system, as depicted in FIGS. 3A and 3B.

Figure 4:
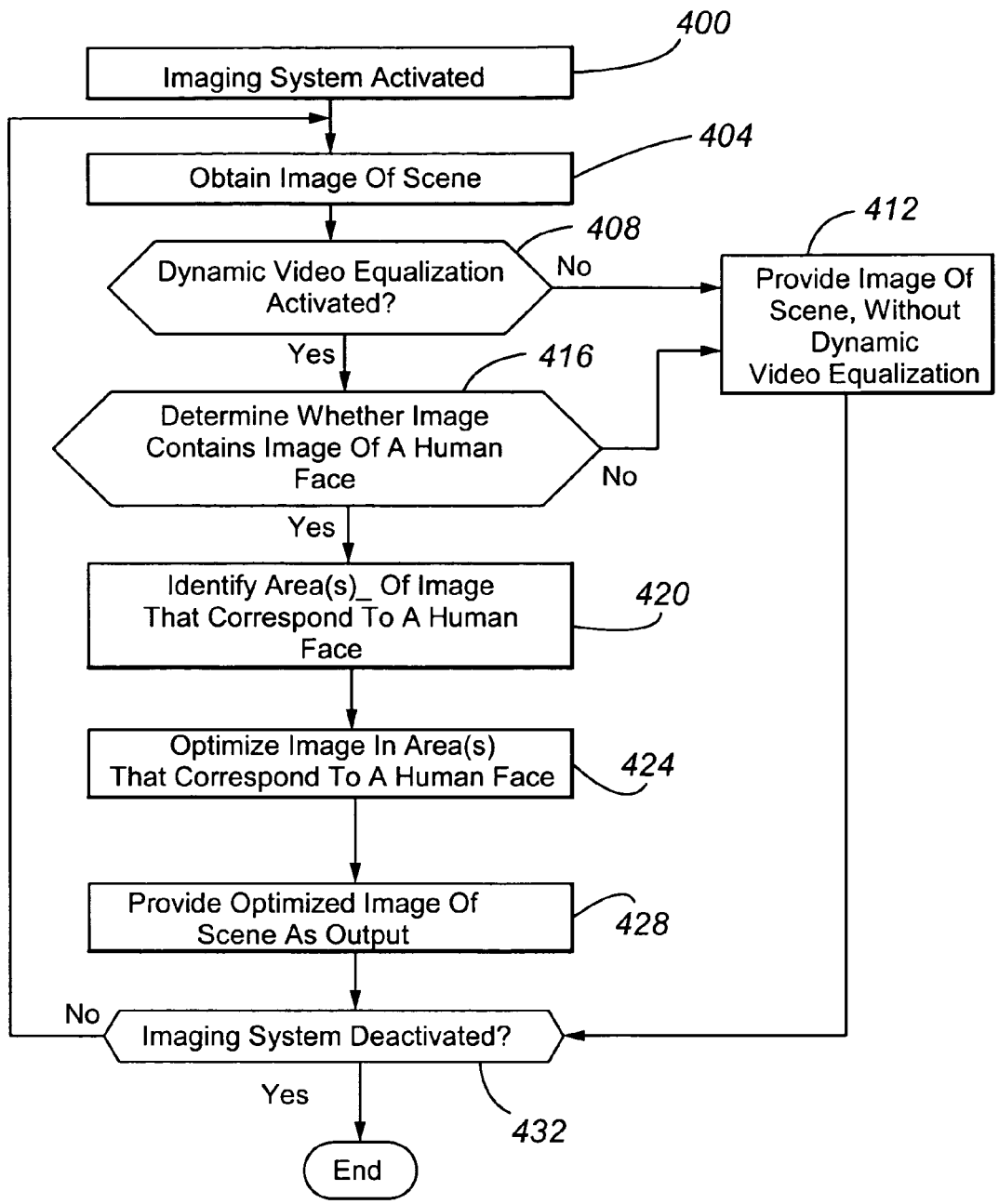
FIG. 4 is a flowchart depicting aspects of the operation of a video conferencing image acquisition and processing system in accordance with embodiments of the present invention.

With reference now to FIG. 4, aspects of the operation of a video conferencing system 100 in accordance with embodiments of the present invention are depicted. Initially, at step 400, the video conferencing system 100 is activated. At step 404, an image of the scene at the first video conference location 204 is obtained. In general, this scene is obtained by a camera 116 at the first video conference location 204.

A determination is then made as to whether dynamic video equalization as described herein has been activated (step 408). If dynamic video equalization has not been activated, an image of the scene is provided, without dynamic video equalization. That is, the image of the scene is represented conventionally, with parameters comprising the image data allocated equally across the entire image (step 412). If dynamic video equalization has been activated, a determination is then made as to whether the image obtained by the camera 116 contains within it an image of a human face 124 (step 416). If it is determined that the image does not contain or include a human face 124, the process may proceed to step 412, and an image of the scene is provided without dynamic video equalization. If it is determined that the scene does include a human face 124, the area or areas of the image that correspond to a human face are identified (step 420). In general, when a single participant 104 is included in an image, conventional face tracking and identification application software will identify a single area that comprises the face 124 of that participant 104. Furthermore, where a number of participants 104 are included in an image from a video conference location 204, the face 124 of each of those participants 104 will generally be identified as a separate area within the image. As used herein, the area comprising the "face" 124 of a participant 104 may comprise just the face itself, the face and hair (i.e., the head) of a participant 104, or all areas of the participant's body that are included in the image, such as the head and shoulders of the participant 104.

At step 424, the image in the area or areas identified as corresponding to a human face 124 are optimized. As noted elsewhere herein, optimization of areas corresponding to a human face 124 within the image may comprise allocating or making available a larger number or range of parameters for use in describing those areas to be optimized, as compared to other areas within an image. The effect of such optimization is to provide an image quality that is superior in those areas of the image that have been optimized, as compared to unoptimized areas of the image. In addition to representing optimized areas with greater fidelity and/or detail, it can be appreciated that the background 312 of an optimized image 304 may exhibit characteristics that are usually considered undesirable. For example, the background 312 of an optimized image 304 may experience color banding, aliasing or other image defects. However, such defects are considered acceptable, because it is the face 124 of video conference participants 104 that is of primary importance to video conferencing applications. At step 428, the optimized image of the scene is provided as output from the first video conference location 204, and in particular from the processor 136 associated with or used by the first video conference location 204. The output may then be displayed at other video conference locations 204.

After providing an optimized image as output at step 428, or after providing an image of this scene without dynamic video equalization or optimization at step 412, a determination is made as to whether the video conferencing system 100 has been deactivated (step 432). If the video conferencing system 100 has not been deactivated, the process may return to step 404, and an image of the scene is again obtained. Accordingly, it can be appreciated that the process of identifying an area or areas within an image corresponding to the face 124 of a video conference participant 104, and optimization of available image information for such area or areas may be performed continuously. Furthermore, optimization may be performed for each frame of an image (i.e., for each frame of video) information that is collected. Because the position of a participant's face 124 within a frame will typically vary from frame to frame, the area within which equalization is applied will typically vary. Accordingly, the area within which optimization or video equalization is performed is dynamic. If at step 432 it is determined that video conferencing system 100 has been deactivated, the process may end.

Although embodiments of the present invention have been described in connection with the transmission of video between video conferencing locations or endpoints in real-time or substantially realtime (e.g., after processing delays), it should be appreciated that the present invention is not so limited. In particular, embodiments of the present invention may be applied wherever video information comprising the face of a person as a subject is to be transmitted and/or recorded. Furthermore, it should be appreciated by one of skill in the art from the description provided herein that embodiments of the present invention may be applied wherever image information comprising the face of a person 124 is to be transmitted, recorded or output as or using a limited number of image parameters.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described herein above are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for enhancing selected portions of an image, comprising:
   a processor obtaining an image, wherein said image includes at least one human face;
   the processor determining an area within said image corresponding to said at least one human face; and
   the processor optimizing said image in said area corresponding to said at least one human face to obtain an optimized image;
      wherein said optimizing said image in said area corresponding to said at least one human face includes:
         allocating a greater number of available colors to a range of colors within said area and a smaller number of available colors to said image outside of said area;
         allocating a greater number of available brightness levels to a brightness range within said area and a smaller number of available brightness levels to said image outside of said area; and
         allocating a greater range of contrast to said at least one area and a smaller range of contrast to said image outside of said area;
      wherein more than one color is included in said range of available colors allocated to portions of said image outside of said area corresponding to said human face,
      wherein a greater portion of an available range of parameter values related to at least one of an available range of colors, available brightness levels, or range of contrast are devoted to said area corresponding to said at least one human face than to other areas of said image,
      wherein a total amount of image information is constant across different frames of a sequence of images, and
      wherein areas of said sequence of images corresponding to said at least one human face change across said different frames of said sequence of images.

2. The method of claim 1, wherein said image is represented by a finite number of parameters and parameter values, and wherein said optimizing said image in said area corresponding to said at least one human face includes allocating a greater number of said parameter values to image information included in said area corresponding to said at least one human face than to other areas of said image.

3. The method of claim 1, wherein said image includes a first number of human faces, wherein one or more areas corresponding to said first number of human faces is determined, and wherein said image is optimized in said one or more areas corresponding to said first number of human faces.

4. The method of claim 1, further comprising:
   providing said optimized image to an output device.

5. The method of claim 4, further comprising:
   initiating a video conference, wherein said image is obtained at a first location and wherein said output device is at a second location.

6. The method of claim 5, wherein said optimizing is performed by a video conferencing endpoint at said first location.

7. The method of claim 1, wherein said determining an area within said image corresponding to at least one human face comprises applying a segmentation algorithm.

8. The method of claim 1, wherein a quality of said area within said optimized image is superior to a quality of said optimized image outside of said area.

9. A system for providing dynamically equalized video output, comprising:
- a first video input device;
- a first video processor interconnected to said first video input device, wherein an area of an image obtained by said first video input device including a human face is optimized to obtain an optimized image, wherein a greater range of image parameters is allocated to said area including a human face than to other areas of said image, wherein a greater range of brightness levels is allocated to said area including a human face than to other areas of said image, wherein a greater range of contrast values is allocated to said area including a human face than to other areas of said image, wherein a plurality of image parameter values are used for said other areas of said image, wherein a greater portion of an available range of image parameter values are allocated to said area including a human face than to other areas of said image, wherein a total amount of available image information available for different frames in a sequence of images is constant, wherein said area of said sequence of images including a human face change for different frames in said sequence of images; and
- a first video output device interconnected to said first video processor, wherein said optimized image is output by said first video output device.

10. The system of claim 9, further comprising:
- a communication network, wherein said first video processor and said first video output device are interconnected by said communication network.

11. The system of claim 9, further comprising:
- a communication network, wherein said first video input device and said first video processor are interconnected by said communication network.

12. The system of claim 9, further comprising a first video conferencing endpoint, wherein said first video input device is provided as part of said first video conferencing endpoint, and wherein said first video processor is provided as part of said first video conferencing endpoint.

13. The system of claim 12, further comprising a second video conferencing endpoint, wherein said first video output device is provided as part of said second video conferencing endpoint.

14. The system of claim 13, wherein said second video conferencing endpoint further includes a second video input device, wherein said first video conferencing endpoint further includes a second video output device, and wherein said second video output device is operable to display image information from said second video input device.

15. The system of claim 14, wherein said second video conferencing endpoint further includes a second video processor interconnected to said second video input device, wherein an area of an image obtained by said second video input device including a human face is optimized to obtain an optimized image, and wherein said optimized image is displayed by said second video output device.

16. The system of claim 12, wherein said first video conferencing endpoint further includes an audio input device and an audio output device.

17. A system for dynamic video equalization of images, comprising:
- means for collecting image data related to a first scene;
- means for determining an area of said collected image data corresponding to an image of a human face; and
- means for selectively optimizing said area of said collected image data corresponding to an image of a human face to obtain optimized image data, wherein said area of said collected image data corresponding to an image of a human face is optimized by the following:
  - allocating a greater number of available colors to a range of colors within said area than is allocated to portions of said collected image data outside of said area corresponding to an image of a human face;
  - allocating a greater number of available brightness levels to a brightness range within said area than is allocated to portions of said collected image data outside of said area corresponding to an image of a human face;
  - allocating a greater number of contrast levels to a contrast range within said area than is allocated to portions of said collected image data outside of said area, wherein more than one color is included in said range of available colors allocated to said portion outside of said area corresponding to an image of a human face, wherein a portion of the image data not corresponding to the image of a human face is represented by a range of values including a plurality of image parameter values, wherein a greater portion of image parameter values including at least one of a number of available colors, a number of available brightness levels, and a number of available contrast levels devoted to said area of collected image data corresponding to an image of a human face is greater than to other areas of said image, wherein a total amount of image information is constant across different frames of a sequence of images, and wherein said area of collected image data corresponding to an image of a human face changes across said different frames of said sequence of images.

18. The system of claim 17, further comprising:
- means for displaying an optimized image from said optimized image data.

19. The system of claim 18, wherein said optimized image is displayed in substantially realtime.

20. The system of claim 18, further comprising:
- means for providing a communication channel, wherein said optimized image data is transmitted to said means for displaying said optimized image.

21. The system of claim 17, wherein said means for selectively optimizing allocates a greater range of values associated with at least a first image parameter to said area of said collected image data than to another area of said collected image data.

* * * * *